(12) United States Patent
Fujioka

(10) Patent No.: US 7,933,054 B2
(45) Date of Patent: Apr. 26, 2011

(54) IMAGE PROCESSING SYSTEM AND IMAGE PROCESSING APPARATUS

(75) Inventor: Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 815 days.

(21) Appl. No.: 11/347,410

(22) Filed: Feb. 6, 2006

(65) Prior Publication Data

US 2006/0187475 A1    Aug. 24, 2006

(30) Foreign Application Priority Data

Feb. 7, 2005   (JP) ................................. 2005-031057

(51) Int. Cl.
G06K 15/00 (2006.01)
H04N 1/46 (2006.01)
(52) U.S. Cl. ...................... 358/540; 358/1.17; 358/1.18
(58) Field of Classification Search .................. 358/1.5, 358/1.9, 400, 402, 537, 1.13, 1.15–1.18, 358/406, 474, 504, 539, 540
See application file for complete search history.

(56) References Cited

U.S. PATENT DOCUMENTS

| 5,896,207 | A | * | 4/1999 | Tomida ......................... 358/537 |
| 5,917,470 | A | | 6/1999 | Fujioka |
| 6,442,296 | B1 | * | 8/2002 | Smith et al. .................. 382/237 |
| 6,535,307 | B1 | * | 3/2003 | Allen et al. .................. 358/504 |
| 7,180,622 | B2 | * | 2/2007 | Cooper ......................... 358/1.15 |
| 2002/0080415 | A1 | * | 6/2002 | Akimoto et al. .............. 358/402 |
| 2003/0233371 | A1 | * | 12/2003 | Abhyankar et al. ....... 707/104.1 |
| 2005/0072849 | A1 | * | 4/2005 | Jones ........................... 235/487 |
| 2006/0157559 | A1 | * | 7/2006 | Levy et al. .................... 235/380 |

FOREIGN PATENT DOCUMENTS

| JP | 11-164114 | | 6/1999 |
| JP | 11-316846 | | 11/1999 |
| JP | 2001-256425 | | 9/2001 |
| JP | 2002292963 | A * | 10/2002 |
| JP | 2003-319111 | | 11/2003 |
| JP | 2003-338924 | | 11/2003 |
| JP | 2006115169 | A * | 4/2006 |

* cited by examiner

Primary Examiner — James A Thompson
(74) Attorney, Agent, or Firm — Harness, Dickey & Pierce, PLC

(57) ABSTRACT

An image processing system is disclosed that is configured to input color image data, generate color image data identification information identifying the color image data, store the color image data identification information in association with the color image data, generate monochrome image data based on the color image data, combine the color image data identification information with the monochrome image data according to a predetermined format and print the combined monochrome image data on a first recording medium. Also, the image processing system is configured to read the combined monochrome image data from the first recording medium, extract the color image data identification information from the combined monochrome image data, read the color image data stored in association with the extracted color image data identification information, and output the read color image data in a predetermined visible format.

11 Claims, 15 Drawing Sheets

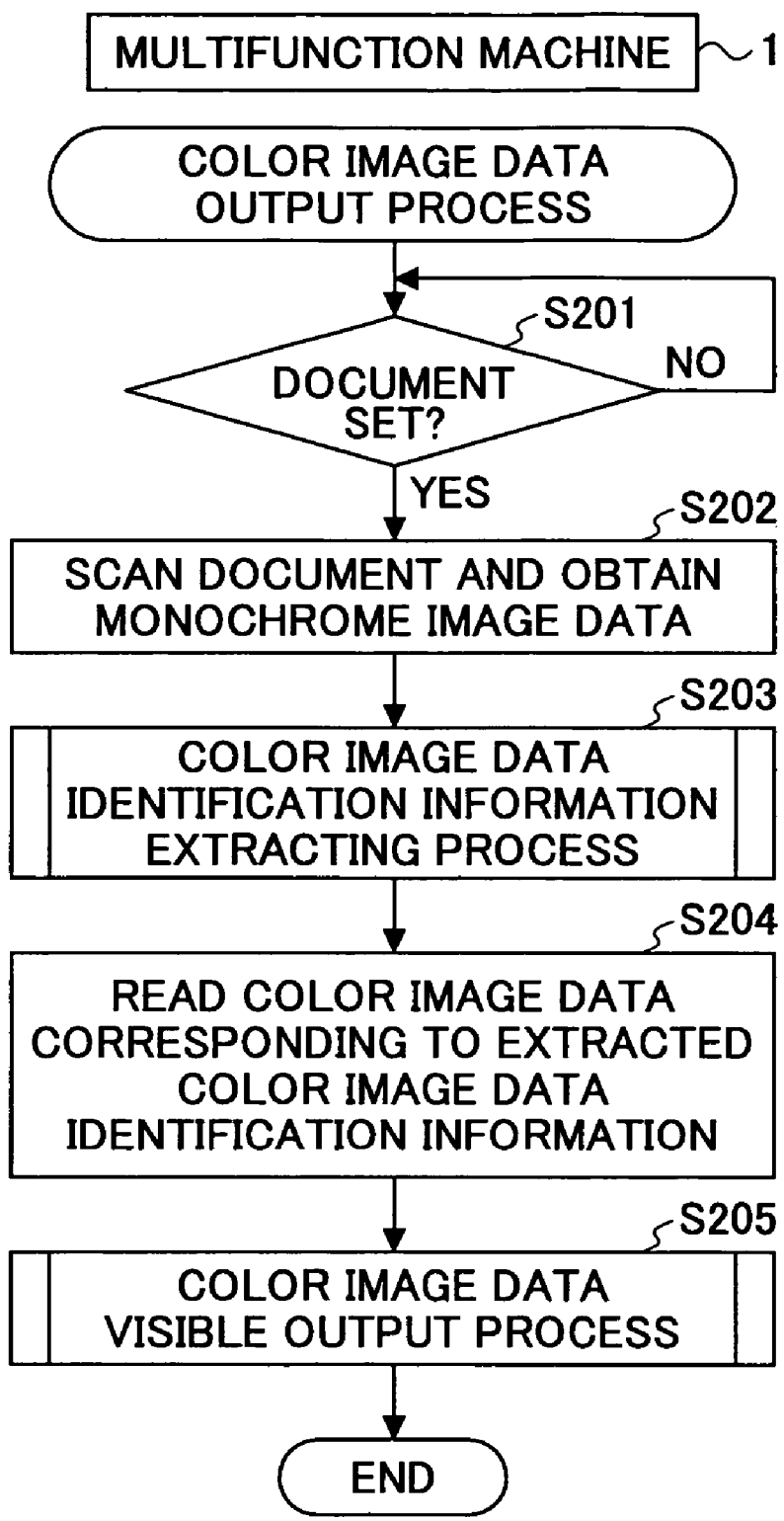

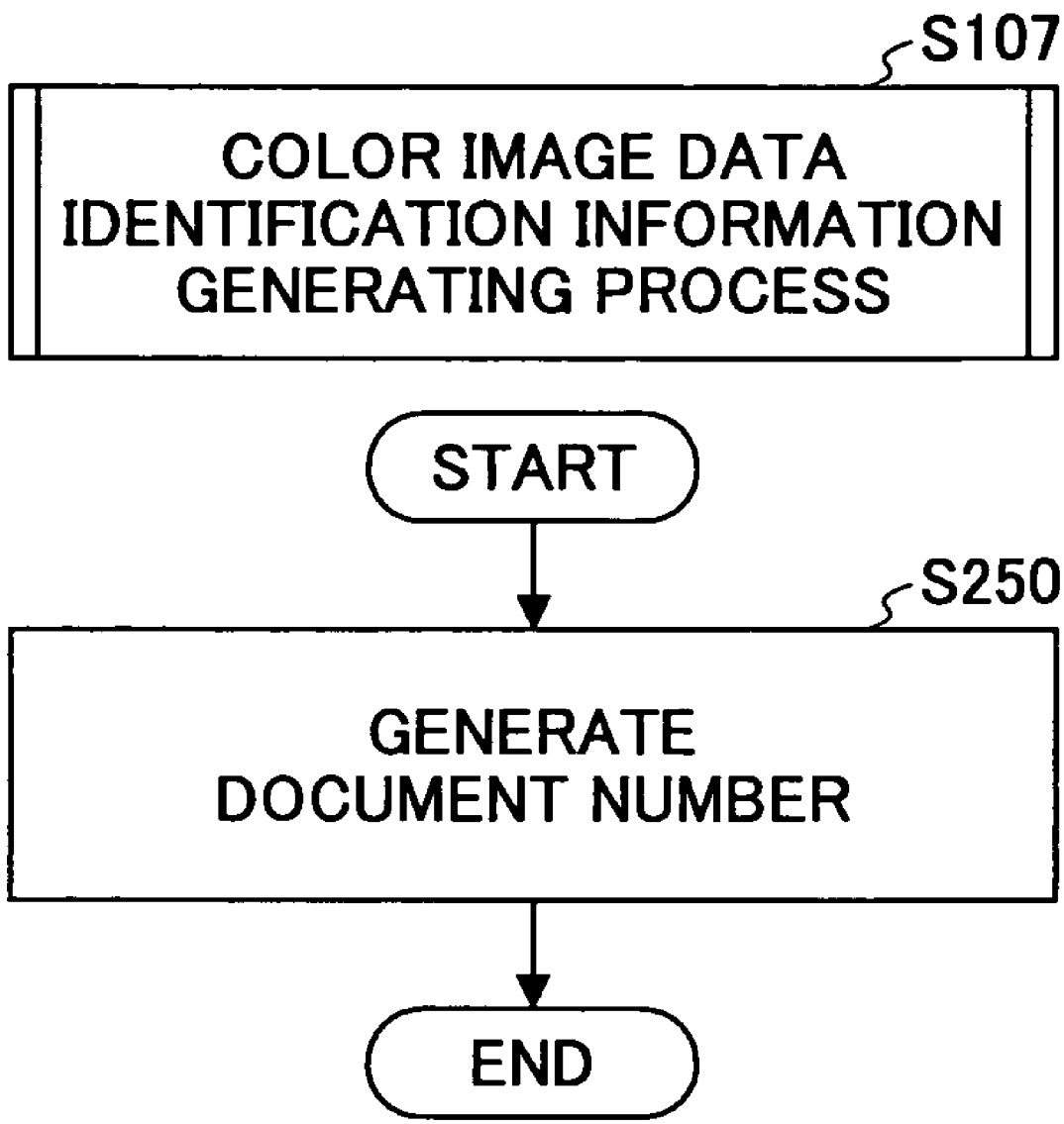

IMAGE PROCESSING SYSTEM AND IMAGE PROCESSING APPARATUS

BACKGROUND OF THE INVENTION

1. Field of the Invention

The present invention relates to an image processing system and an image processing apparatus for performing output control relating to printing of input color image data.

2. Description of the Related Art

In a color image processing apparatus such as a color facsimile machine that includes a color image transmission apparatus for establishing color image data communication between a remotely located communication counterpart apparatus, arrangements may be made to automatically print out color image data received from the communication counterpart apparatus on a recording medium such as recording paper. However, a receiver (user) may not wish to have certain types of received image data printed out in such a manner. For example, unsolicited images such as advertisement images and spam images may not be desired by the user.

It is noted that a user may not wish to have certain types of received color image data or read (scanned) image data printed in the form of color images and may instead wish to have the received color image data printed in monochrome format, for example. Generally, in a color image processing apparatus, when color image data are received or read (scanned), such data are unconditionally printed as a color image. In such a case, even received/read color image data that do not necessarily have to be color printed are printed as color images to thereby waste consumable supplies such as color ink or color toner.

Also, when received/read color image data are arranged to be displayed at a monitor, for example, working efficiency may be improved by having the received/read color image data printed out on paper for reference. In such a case, since the color information of the received/read image data may be viewed at the monitor, the printed image corresponding to the received/read image data may not have to be in color image format (i.e., the monochrome image format may suffice).

In view of such circumstances, Japanese Laid-Open Patent Publication No. 2003-319111 discloses a technique for converting color image data received through data communication into monochrome image data and printing out the converted monochrome image data. However, according to the above disclosed technique, when a user wishes to have the received color image data printed as a color image, the user has to go through the trouble of inputting a corresponding registration number of the image data. Thus, the print designating operations may be burdensome and annoying in this case.

Also, in a case where a color image of a page of a book or a catalog, for example, is read (scanned) and the read color image data as image data to be subsequently printed are stored in a storage device arranged within the relevant color image processing apparatus or an external server apparatus connected to the relevant color image processing apparatus via a network, in general, a corresponding registration number of the read image data has to be input in order to print out the stored image data. Thus, the print designating operations may be burdensome and annoying in this case as well.

SUMMARY OF THE INVENTION

According to preferred embodiments of the present invention, an image processing system and an image processing apparatus with good economical efficiency as well as good operability are provided in which input color image data are converted into monochrome image data to be printed, and the original input color image data are printed in response to a user request that may be made through simple operations.

An image processing system according to one preferred embodiment of the present invention includes:

a color image input unit configured to input color image data;

an identification information generating unit configured to generate color image data identification information identifying the color image data input by the color image input unit;

an image data storing unit configured to store the color image data identification information in association with the processing color image data;

a monochrome image generating unit configured to generate monochrome image data based on the color image data;

a monochrome image output unit configured to combine the color image data identification information with the monochrome image data according to a predetermined format and print the combined monochrome image data on a first recording medium;

an image reading unit configured to read the combined monochrome image data from the first recording medium and input the combined monochrome image data;

an identification information extracting unit configured to extract the color image data identification information from the combined monochrome image data; and a color image output unit configured to read from the image data storing unit the color image data associated with the color image data identification information extracted by the identification information extracting unit and output the color image data in a predetermined visible format.

According to a preferred embodiment of the present invention, the color image input unit receives the color image data from a communication counterpart.

According to another preferred embodiment of the present invention, the color image input unit reads the color image data from a physical document.

According to another preferred embodiment of the present invention, the color image output unit prints the color image data on a second recording medium.

According to another preferred embodiment of the present invention, the color image output unit displays the color image data on a display unit.

According to another preferred embodiment of the present invention, the monochrome image output unit generates barcode image data including the color image data identification information, combines the generated barcode image data with the monochrome image data, and prints the combined monochrome image data on the first recording medium; and the identification information extracting unit extracts the color image data identification information from the barcode image data included in the combined monochrome image data input by the image reading unit.

According to another embodiment of the present invention, the monochrome image output unit generates two-dimensional code image data including the color image data identification information, combines the generated two-dimensional code image data with the monochrome image data, and prints the combined monochrome image data on the first recording medium; and the identification information extracting unit extracts the color image data identification information from the two-dimensional code image data included in the combined monochrome image data input by the image reading unit.

According to another embodiment of the present invention, the monochrome image output unit generates digital watermark data as the color image data identification information, combines the generated digital watermark data with the monochrome image data, and prints the combined monochrome image data on the first recording medium; and the identification information extracting unit extracts the color image data identification information from the digital watermark data included in the combined monochrome image data input by the image reading unit.

An image processing apparatus according to a preferred embodiment of the present invention includes the elements of the image processing system according to an embodiment of the present invention.

BRIEF DESCRIPTION OF THE DRAWINGS

FIG. 3 is a flowchart illustrating process steps of a color image data output process performed at the multifunction machine of FIG. 1 according to one embodiment of the present invention;

FIG. 4 is a flowchart illustrating an exemplary specific process step of a color image data identification information generating process;

DESCRIPTION OF THE PREFERRED EMBODIMENTS

In the following, preferred embodiments of the present invention are described with reference to the accompanying drawings.

Figure 1:
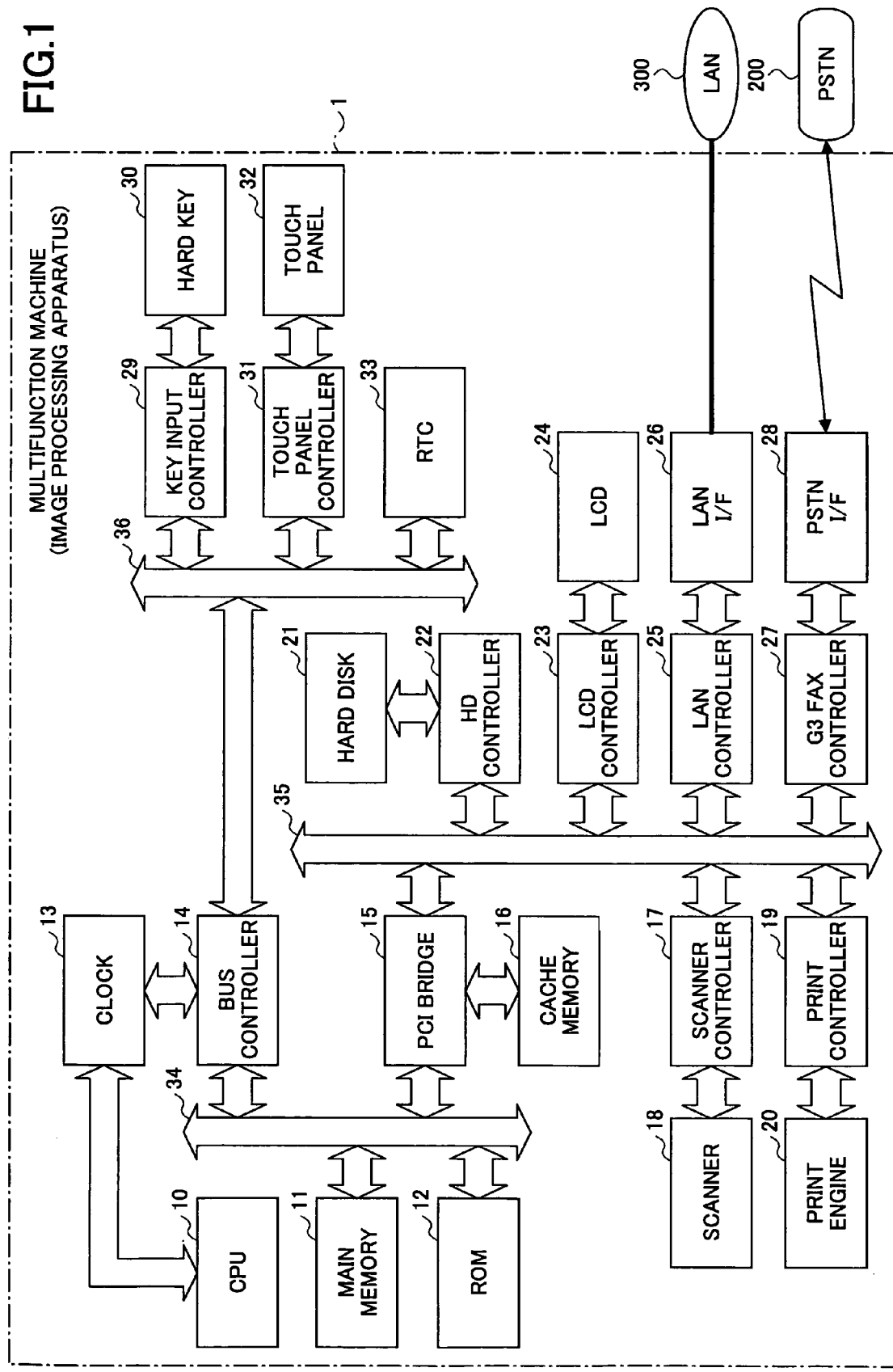
FIG. 1 is a block diagram showing a configuration of a multifunction machine as an embodiment of an image processing apparatus according to the present invention.

FIG. 1 is a block diagram showing a configuration of a multifunction machine 1 as an embodiment of an image processing apparatus according to the present invention.

As is shown in this drawing, the multifunction machine 1 according to the present embodiment includes a CPU 10, a main memory 11, a ROM (Read Only Memory) 12, a clock 13, a bus controller 14, a PCI (Peripheral Component Interconnect) bridge 15, a cache memory 16, a scanner controller 17, a scanner 18, a print controller 19, a print engine 20, a hard disk 21, a HD (hard disk) controller 22, a LCD controller 23, a LCD 24, a LAN controller 25, a LAN I/F (interface) 26, a G3 Fax controller 27, a PSTN (Public Switched Telephone Network) I/F 28, a key input controller 29, a hard key 30, a touch panel controller 31, a touch panel 32, a RTC (Real Time Clock) 33, a CPU bus 34, a PCI bus 35, and an X bus (internal bus) 36, for example.

The CPU 10 is configured to execute and process control processing programs and OS (operating system) stored in the ROM 12.

The main memory 11 may be a DRAM (Dynamic Random Access Memory) that is used as a working area of the CPU 10, for example.

The ROM 12 has various programs preformatted therein for realizing system startup when the power is turned on and performing various functions of the multifunction machine 1.

The clock 13 includes a crystal oscillator and a dividing circuit, and is configured to generate a clock for controlling the operation timings of the CPU 10 and the bus controller 14.

The bus controller 14 is configured to control data transmission realized by the CPU bus 34 and the X bus 36.

The PCI bridge 15 is configured to realize data transmission between the PCI bus 35 and the CPU 10 using the cache memory 16.

The cache memory 16 may be realized by a DRAM that is used by the PCI bridge 35.

The scanner controller 17 is configured to control document reading operations of the scanner 18.

The scanner 18 is configured to scan (read) an image of a page using a CCD line sensor.

The print controller 19 is configured to control operations of the print engine 20.

The print engine 20 is configured to use toner to create a color image or a monochrome image on a recording medium such as paper.

The hard disk 21 is configured to store data including image data input from the scanner 18, image data received through communication, and barcode data as identification information of color image data, for example.

The HD controller 22 includes an interface with the hard disk 21 such as an IDE (Integrated Device Electronics) interface, and is configured to realize high speed data transmission between the hard disk 21.

The LCD controller 23 is configured to perform control operations for realizing D/A (digital/analog) conversion of data such as text data and graphic data, and displaying the data at the LCD 24.

The LAN controller 25 may realize a communication protocol conforming to the IEEE (Institute of Electrical and Electronics Engineers) 802.3 standard, for example, and is configured to control communication with another apparatus connected to an Ethernet LAN via its LAN I/F 26.

The G3 Fax controller 27 is configured to use a built-in modem to transmit/receive a G3 Fax modem signal to realize G3 Fax communication according to the ITU-T Recommendation T.30. The G3 Fax controller 27 enables transmission/reception of color image data in G3 Fax mode according to the ITU Recommendation T.30 Annex E (TTC standard JT-T30 Annex D).

The key input controller 29 is configured to convert serial data input from the hard key 30 into parallel data.

The touch panel controller 31 is configured to detect a portion of the touch panel 32 that is in contact with a touching object such as a finger, and acquire position information of the detected portion. The touch panel 32 is layered and adhered to the LCD 24.

The RTC33 is a date/time clock that is backed up by a battery (not shown).

In the following, operation processes performed in the multifunction machine 1 according to embodiments of the present invention are described. It is assumed that the process steps of these operation processes are executed by the CPU 10 according to control processing programs stored in the ROM 12 using the main memory 11 as a working area unless specified otherwise.

Figure 2:
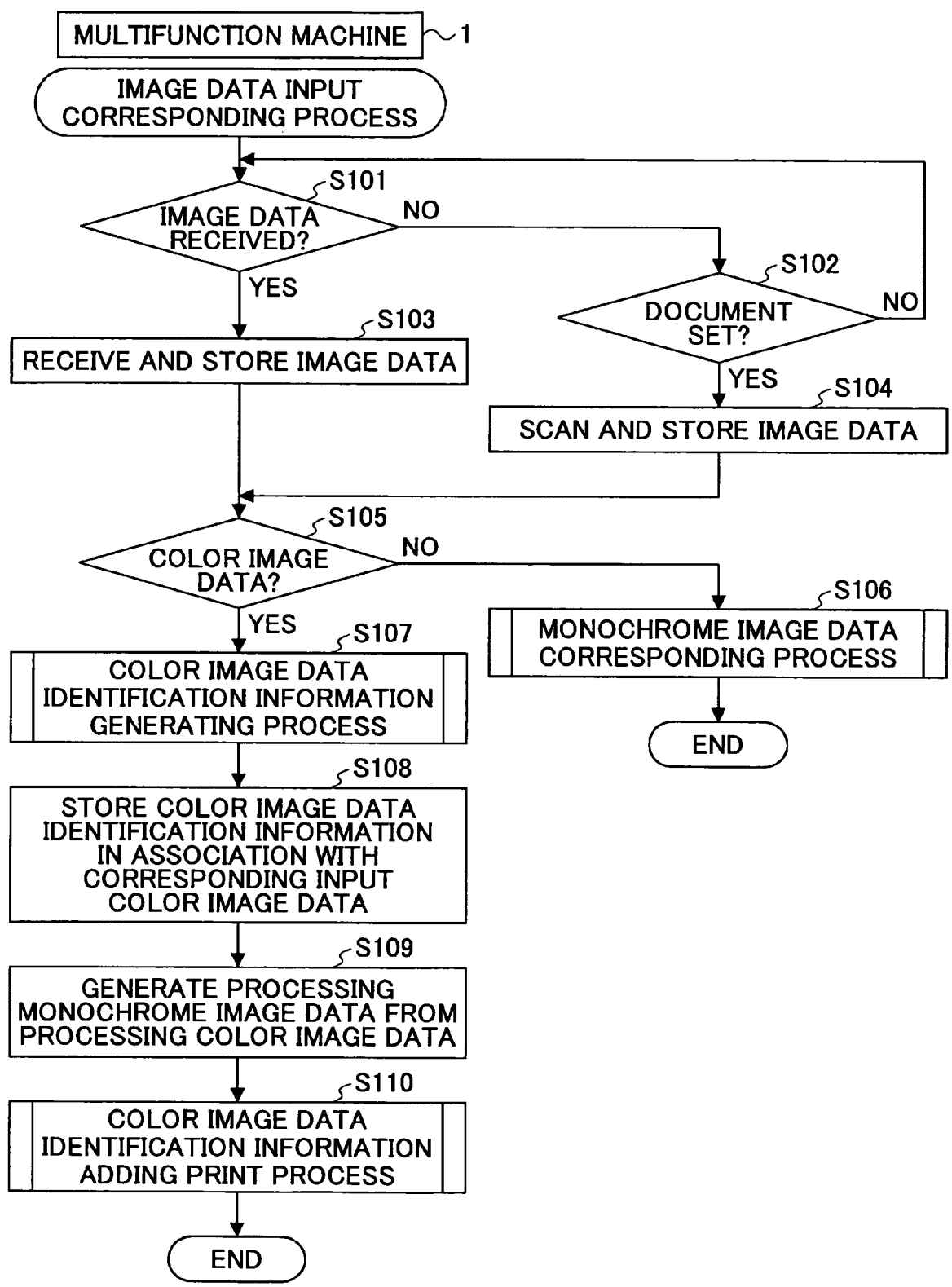
FIG. 2 is a flowchart illustrating process steps of an image data input corresponding process performed at the multifunction machine of FIG. 1 according to one embodiment of the present invention.

FIG. 2 is a flowchart illustrating a process flow of an image data input corresponding process that is performed in the multifunction machine 1 according to one embodiment.

As is shown in this drawing, in this process, input of monochrome or color image data is monitored. Specifically, image input monitoring is realized by determining whether image data are received or a document is set to the scanner 18 (i.e., loop realized by determination step S101, a negative determination 'NO' in step S101, determination step S102, and the negative determination 'NO' in step S102).

In the determination step S101, reception of image data is monitored. In this example, image data reception may be any type of reception including reception realized by the G3 Fax controller 27 through G3 facsimile communication via a PSTN (Public Switched Telephone Network) 200 (see FIG. 1), reception through real time network facsimile communication based on the ITU-T Recommendation T.38 via a LAN 300 (see FIG. 1), reception through email network facsimile transmission based on the ITU-T Recommendation T.37, and image data reception in response to a print request from another PC (personal computer) connected via the LAN 300 according to the SOAP protocol, for example. In other words, the reception being monitored in the determination step S101 may generally include any form of image data input from an apparatus or system other than the image processing apparatus 1. It is noted that color image data transmission/reception through G3 facsimile communication is defined in the ITU-T Recommendation T.30 Annex E.

When the G3 Fax controller 27 of the multifunction machine 1 receives color image data through G3 facsimile communication according to the ITU-T Recommendation T.30 Annex E, the CPU 10 issues a document number for unambiguously identifying the received color image data, and stores the document number in association with the corresponding received color image data in the hard disk 21.

In the present example, image data may be input in another manner; namely, a document may be scanned (read) by the scanner 18 and the scanned image data may be input to the multifunction machine 1. Such input of image data through scanning by the scanner 18 is monitored in the determination step S102.

When it is determined in step S101 that image data are received ('Yes' in step S101), the image data are received and stored in the hard disk 21 (step S103), and the process moves on to determination step S105.

When it is determined in step S102 that a document has been set ('Yes' in step S102), the image of the document is scanned and the scanned image data are stored in the hard disk 21 (step S104) after which the process moves on to the determination step S105.

In the determination step S105, a determination is made as to whether the input image data correspond to color image data or monochrome image data. If it is determined that the input image data correspond to monochrome image data ('No' in step S105), a normal monochrome image data corresponding process is performed (step S106).

If it is determined in step S105 that the input image data correspond to color image data ('Yes' in step S105), color image data corresponding processes are performed as is described below.

Specifically, the process moves on to step S107 in which a color image data identification information generating process is performed. Then, in step S108, the generated color image data identification information is associated with the relevant input color image data, and the color image data identification information is stored in the hard disk 21 in association with the relevant input color image data. It is noted that the relevant input color image data for which the color image identification information is generated are already stored in the hard disk 21 (step S103), and may be referred to as 'processing color image data' in the following descriptions.

Then, in step S109, processing monochrome image data are generated from the processing color image data. In one example, color image data received through G3 facsimile communication are encoded according to the JPEG standard (ITU-T Recommendation T.81, ISO/IEC 10918-1), and the received color image data are decoded according to the JPEG standard after which brightness component data of the respective pixels of the decoded image data are extracted to generate the monochrome image data.

Then, the color image data identification information generated in step S107 is added to (combined with) the generated monochrome image data according to a predetermined format (details of which are described below), and the generated monochrome image data are printed on a recording medium such as recording paper (step S110) after which the process is ended.

According to the present embodiment, input color image data are printed as a monochrome image so that color toner, color ink, or a color ink ribbon (according to the print method implemented by the print engine 20) may be saved, and operations cost may be reduced.

More specifically, in the present embodiment, input color image data is automatically printed as a monochrome image without any command operation input from the user. It is noted that in most cases, contents or features of the input color image data may be adequately grasped from its corresponding printed monochrome image. Thus, the present embodiment may be preferred taking into consideration the merits of printing input image data as a monochrome image as opposed to a color image. Specifically, cost increase due to color printing undesired images such as color advertisement and spam images may be avoided. Also, in the present embodiment, a color image is not output (printed) from reproducing (copying) a color document; that is, a monochrome image is output upon reproducing the color document while the color image data obtained in the copying operation are stored to be used in a subsequent reproducing operation. In this way, a document may normally be reproduced as a monochrome image so that cost increase may be avoided.

It is noted that in some cases, a user may desire to view a printed image of input color image data in its original color image format. The image processing apparatus according to an embodiment of the present invention is configured to adequately correspond to such desires of the user.

Accordingly, the image processing apparatus 1 of the present embodiment is configured to perform the image data input corresponding process as is illustrated in FIG. 2, and is also configured to perform a color image data output process as is illustrated in FIG. 3, for example.

In the color image data output process of FIG. 3 according to one embodiment, setting of a document to the scanner 18 is monitored (loop realized by determination step S201 and the negative determination step 'NO' in step S201). When a document is set to the scanner 18 ('Yes' in step S201), the document is scanned and monochrome image data of the document are obtained (step S202). It is noted that in step S202, color scanning of the document may be performed to obtain color image data of the document and post processing may be performed on the color image data to obtain monochrome image data corresponding to the obtained color image data, or alternatively, monochrome image data may be directly obtained from the document through monochrome scanning, for example.

Then, a color image data identification information extracting process is performed on the obtained monochrome image data (step S203), and color image data corresponding to the extracted color image data identification information are read from the hard disk 21, and the read color image data are output in visible format (step S205).

By performing the above-described processes according to the present embodiment, color image data that are printed as a monochrome image may be output as a color image as is necessary or desired based on the printed monochrome image. More specifically, in the present embodiment, instead of having to go through the trouble of memorizing a corresponding registration number for desired color image data and requesting for the output of the color image data by designating the registration number, the user may simply set the printed monochrome image that he/she desires to view in color image format to the scanner 18 in a manner similar to the procedure for operating the scanner 18 to scan a document to be copied or transmitted, for example. In this way, a color image processing apparatus with good economical efficiency and good operability may be realized.

FIG. 4 is a flowchart illustrating a specific process step that may be performed in the color image data identification information generating process of step S107 of the image data input corresponding process illustrated in FIG. 2 according to one embodiment.

In FIG. 4, a document number is generated as the color image data identification information (step S250). For example, the document number may be a four-digit number string such as '0099', a symbol string such as 'ABCDE', or a combination of numbers and symbols. In other words, the document number may be any form of non-overlapping information used to identify a corresponding set of color image data from one or more other sets of color image data that are stored in the hard disk 21.

Figure 5C:
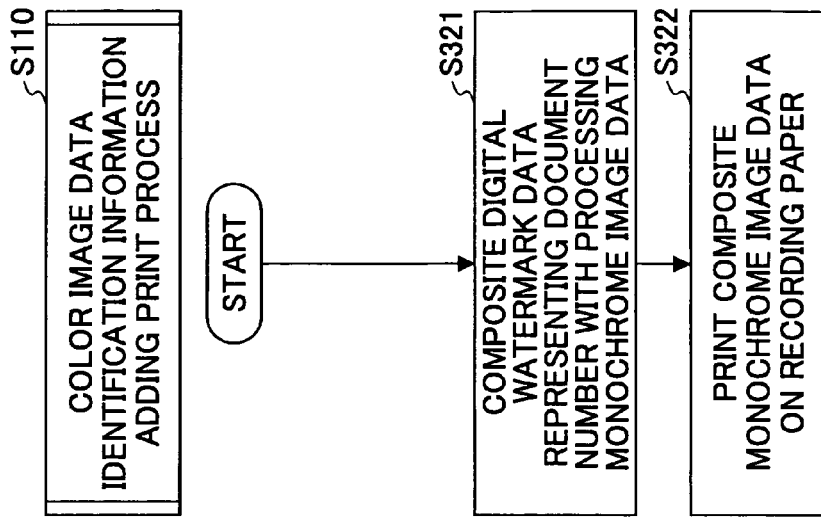
FIGS. 5A-5C are flowcharts illustrating exemplary specific process steps of a color image data identification information adding print process.
Figure 5B:
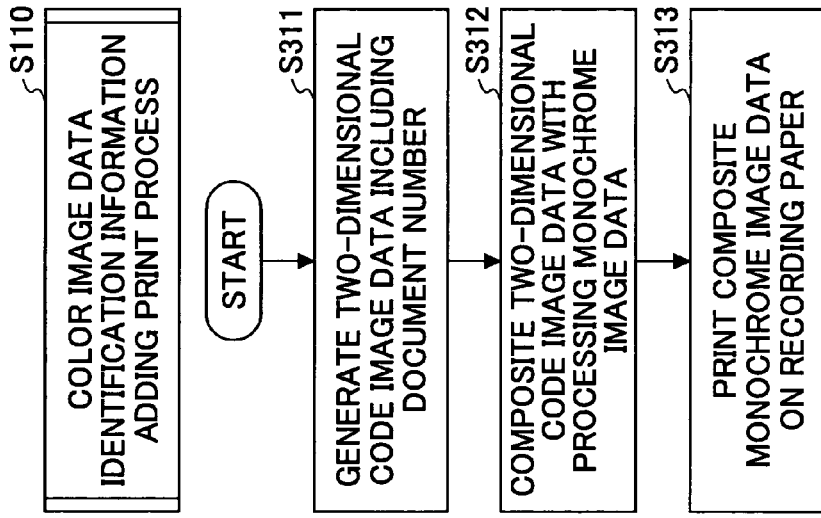
Figure 5A:
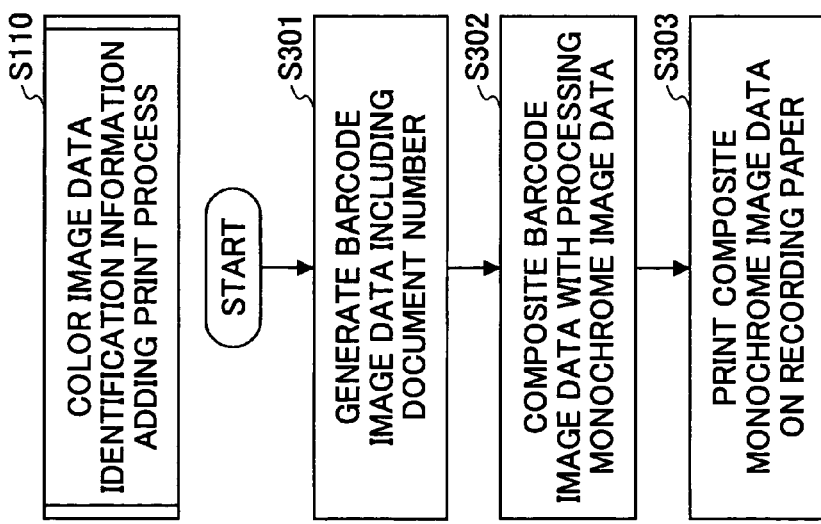

In a case where the process step of FIG. 4 is performed as the color image data identification information generating process step S107 of FIG. 2, the process step S110 of FIG. 2 for adding (combining) the color image data identification information and printing the combined monochrome image data may be performed according to one of the process flows illustrated in FIG. 5A, 5B, or 5C, for example.

Figures 6A, 6B, 6C:
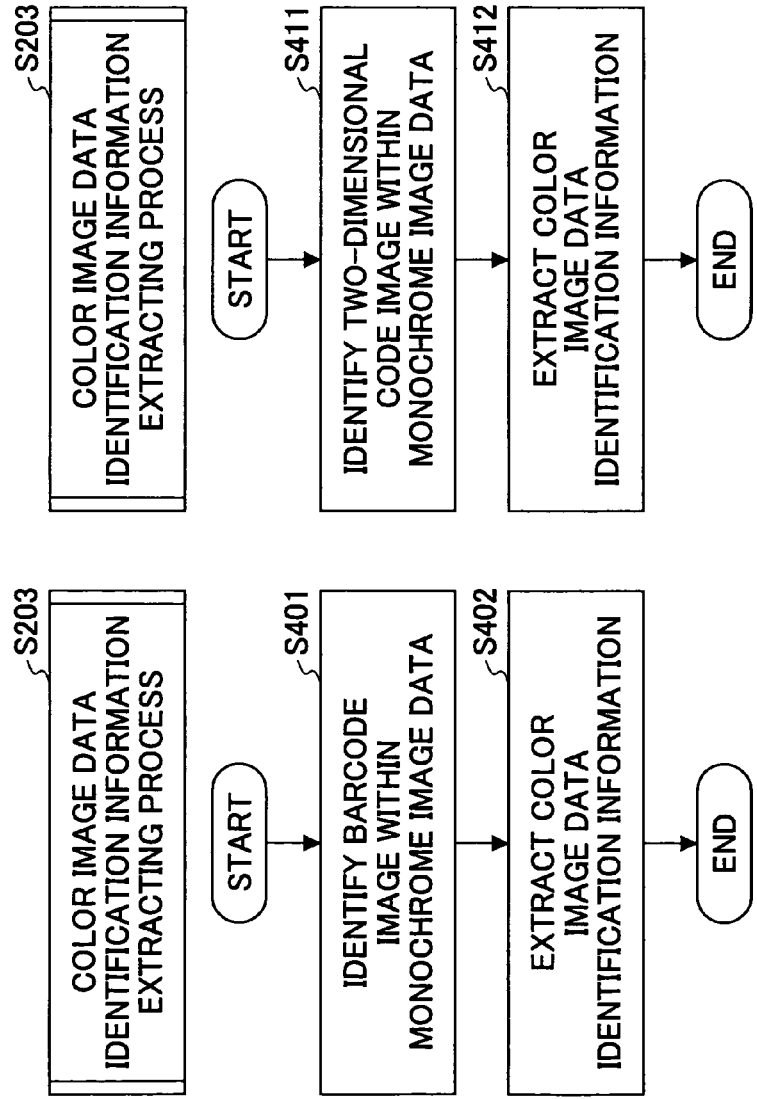
FIGS. 6A-6C are flowcharts illustrating exemplary specific process steps of a color image data identification information extracting process.

Further, when the process flow illustrated in FIG. 5A, 5B, or 5C is performed as the process step S110 of FIG. 2, the process flow illustrated in FIG. 6A, 6B, or 6C may be performed, respectively, as the color image data identification information extracting process step S203 of FIG. 3.

In the process flow of FIG. 5A (step S110), barcode image data including data representing the document number are generated (step S301), and the generated barcode image data are composited with the processing monochrome image data currently being developed at the main memory 11 (step S302) after which the composite image data are printed (output) on recording paper by the print engine 20 (step S303).

Figure 8:
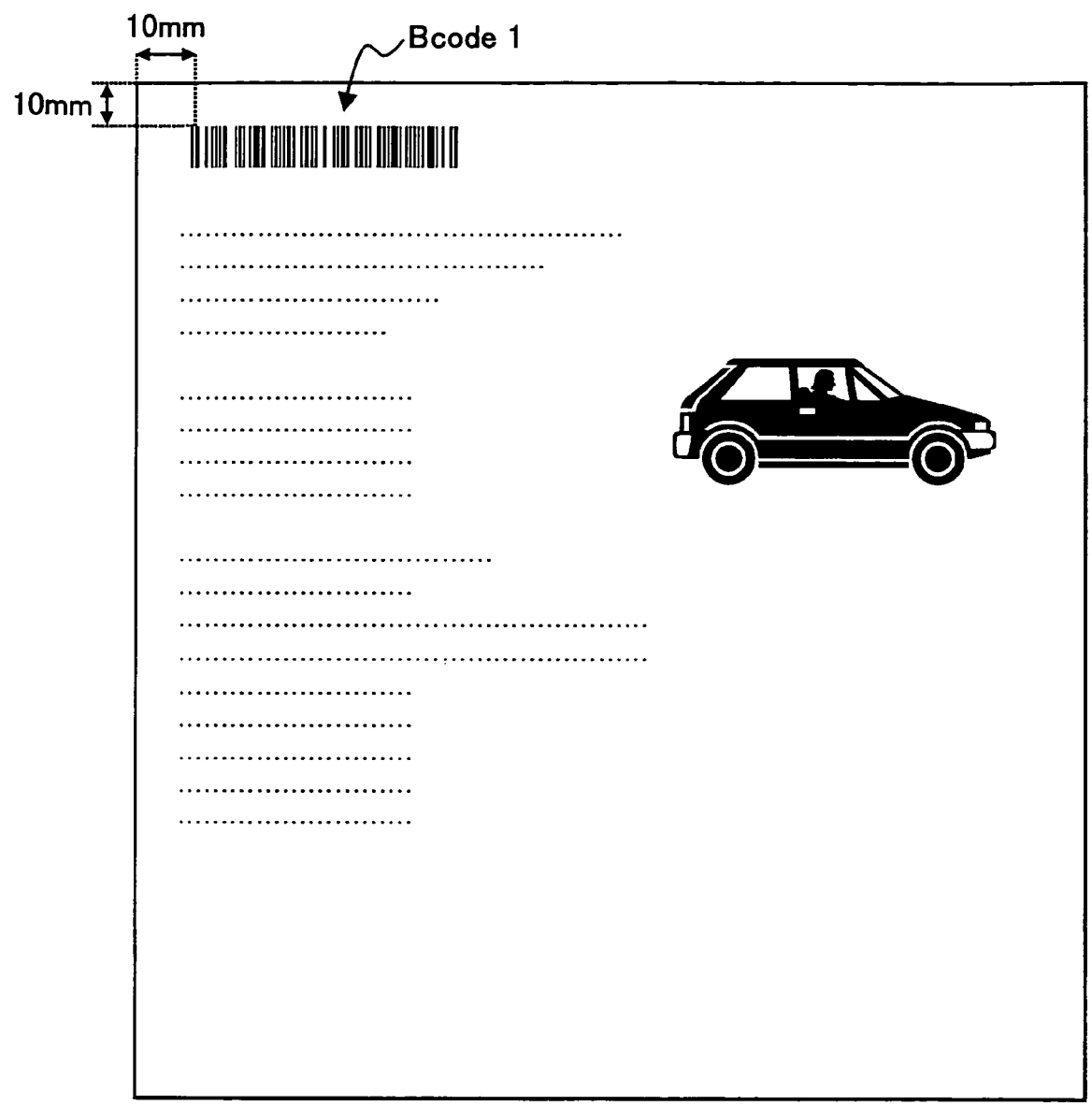
FIG. 8 is a diagram illustrating an exemplary printout of monochrome image data with a barcode added thereto.

It is noted that the barcode image data generating step S301 may be performed according to the NW7 (JIS-X-0503) specification, for example. Also, as is shown in FIG. 8, the barcode image data compositing step S302 may be executed in a manner such that a barcode image Bcode1 corresponding to the generated barcode image data may be recorded at the upper left hand portion of the recording paper starting from a position situated 10 mm to the right and 10 mm downward from the upper left hand corner position of the recording paper, for example. It is noted that the position at which the barcode image is inserted (added) is not limited to the position as is illustrated in FIG. 8, and in other examples, the barcode image may be inserted at the upper right hand corner portion, the lower right hand corner portion, the lower left hand corner, or any other position within the recording paper provided that the barcode image does not overlap with the monochrome image to be printed.

When the process flow of FIG. 5A is performed as the process step S110 of FIG. 2, the process flow as is illustrated in FIG. 6A is performed as the process step S203 of FIG. 3.

In the process flow of FIG. 6A (step S203), first, the barcode image data within the monochrome image data are identified (step S401). Since it may be determined in advance that the recording start position for the barcode image is at the point 10 mm to the right and 10 mm downward with respect to the upper left hand corner of the recording paper, the recording position of the barcode image data may be easily determined. In one specific example, when the scanning density of the scanner 18 is 200 dpi (dots per inch), a barcode data recognition process is started from the $75^{th}$ pixel to the right and 75 pixels downward from the pixel at upper left hand corner of the scanned image data.

It is noted that the barcode data recognition start position is determined in advance taking into consideration factors such as errors in the recording position of the recording paper, and errors in the scanning position of the scanner 18, for example. It is noted that in one example, the barcode image may be recognized according to a barcode recognition method as is described in Japanese Laid-Open Patent Publication No. 11-164114, which is hereby incorporated by reference in its entirety. Then, the code pattern of the recognized barcode is decoded and the color image data identification information represented by the barcode; namely, the document number, is extracted (step S402). In turn, the color image data stored in the hard disk 21 that is associated with the extracted document number may be determined.

In the process flow of FIG. 5B (step S110), two-dimensional code image data including data representing the document number are generated (step S311), and the generated two-dimensional code image data are composited with the processing monochrome image data currently being developed at the main memory 11 (step S312) after which the composite image data are printed (output) on recording paper by the print engine 20 (step S313).

Figure 9:
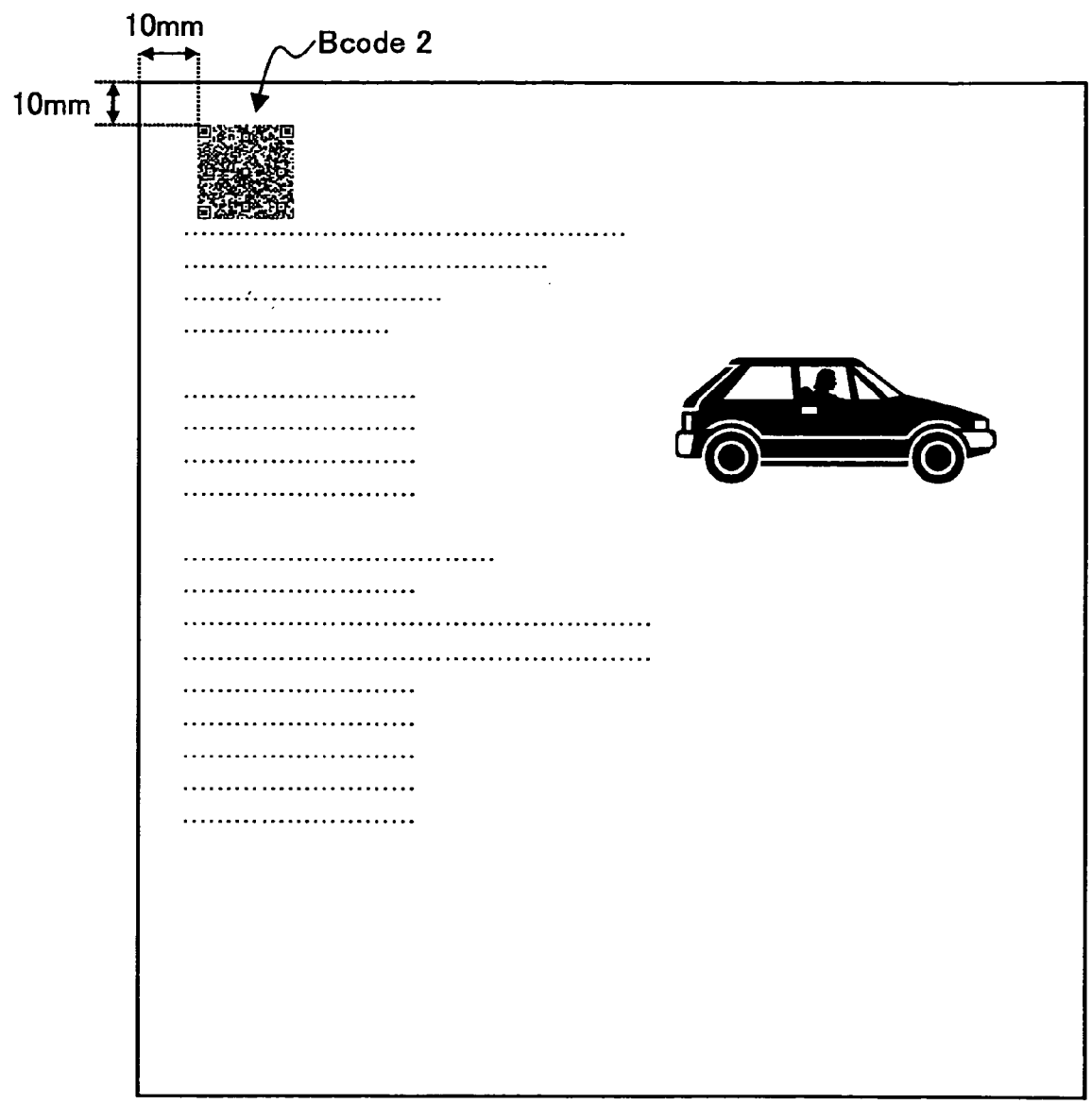
FIG. 9 is a diagram illustrating an exemplary printout of monochrome image data with a two-dimensional code added thereto.

It is noted that the two-dimensional code image data generating step S311 may be performed according to the QR code (JIS-X-0510) specification, for example. Also, as is shown in FIG. 9, the two-dimensional code image data compositing step S312 may be executed in a manner such that a two-dimensional code image Bcode2 corresponding to the generated two-dimensional code image data may be recorded at the upper left hand portion of the printed recording medium starting from a position situated 10 mm to the right and 10 mm downward from the upper left hand corner position of the recording paper, for example. It is noted that the position at which the two-dimensional code image is inserted (added) is not limited to the position as is illustrated in FIG. 9, and in other examples, the two-dimensional code image may be inserted at the upper right hand corner portion, the lower right hand corner portion, the lower left hand corner portion, or any other position within the recording paper provided that the two-dimensional code image does not overlap with the monochrome image to be printed.

When the process flow of FIG. 5B is performed as the process step S110 of FIG. 2, the process flow as is illustrated in FIG. 6B is performed as the process step S203 of FIG. 3.

In the process flow of FIG. 6B (step S203), first, the two-dimensional code image data within the monochrome image data are identified (step S411). Since it may be determined in advance that the recording start position of the two-dimensional code image data is at the point 10 mm to the right and 10 mm downward with respect to the upper left hand corner of the recording paper, the recording position of the two-dimensional code image data may be easily determined. In one specific example, when the scanning density of the scanner 18 is 200 dpi (dots per inch), a two-dimensional code data recognition process is started from the 75$^{th}$ pixel to the right and 75 pixels downward from the pixel at the upper left hand corner of the scanned image data.

It is noted that the two-dimensional code data recognition start position is determined in advance taking into consideration factors such as errors in the recording position of the recording paper, and errors in the scanning position of the scanner 18, for example. It is noted that the two-dimensional code image may be recognized according to a two-dimensional code image recognizing method as is described in Japanese Laid-Open Patent Publication No. 2001-256425, for example. Then, the code pattern of the recognized two-dimensional code is decoded and the color image data identification information represented by the two-dimensional code; namely, the document number, is extracted (step S412). In turn, the color image data stored in the hard disk 21 that is associated with the extracted document number may be determined.

In the process flow of FIG. 5C (step S110), digital watermark data representing the document number are composited with the processing monochrome image data currently being developed at the main memory 11 (step S321) after which the composite image data are printed (output) on recording paper by the print engine 20 (step S322).

It is noted that the digital watermark data compositing step S321 may be performed according to a technique disclosed in Japanese Laid-Open Publication No. 2003-338924, for example. Specifically, a text area may be extracted from the monochrome image data, and digital watermark data may be embedded in the extracted text area.

When the process flow of FIG. 5C is performed as the process step S110 of FIG. 2, the process flow as is illustrated in FIG. 6C is performed as the process step S203 of FIG. 3.

In the process flow of FIG. 6C (step S203), first, the digital watermark data within the monochrome image data are extracted (step S421), and the color image data identification information represented by the digital watermark data; namely, the document number, is extracted (step S422). In turn, the color image data stored in the hard disk 21 that is associated with the extracted document number may be determined.

As can be appreciated from the above descriptions, various methods may be employed for adding (combining), identifying, and/or extracting color image data identification information with respect to monochrome image data to be printed. It is noted that such methods are by no means limited to the examples described above. In one alternative example, the document number may be represented by text, and the text may be added to (combined with) the monochrome image data and printed at a predetermined position on a recording paper along with the monochrome image data. In such a case, the document number may be extracted through character recognition, for example. Also, the document number may be recorded on and read from an IC tag that is embedded in the recording paper. Such an arrangement may be advantageous if the price of such IC tag embedded recording paper is reduced. In another example, the document number may be magnetically recorded on and read from the recording paper.

In the following, exemplary process flows of the color image data visible output process step S205 in the color image data output process of FIG. 3 are described.

Figure 7A:
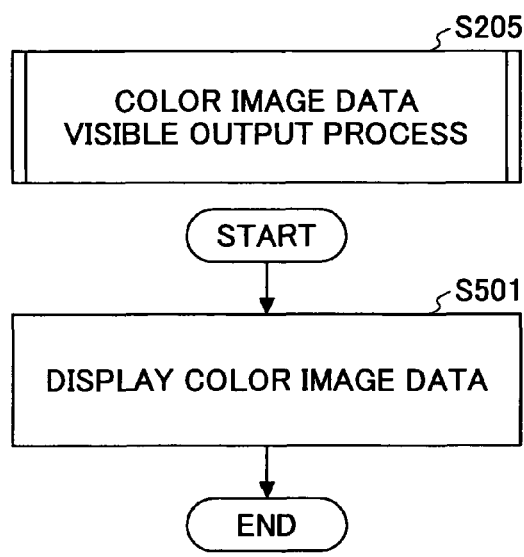
FIGS. 7A and 7B are flowcharts illustrating exemplary specific process steps of a color image data visible output process.
Figure 7B:
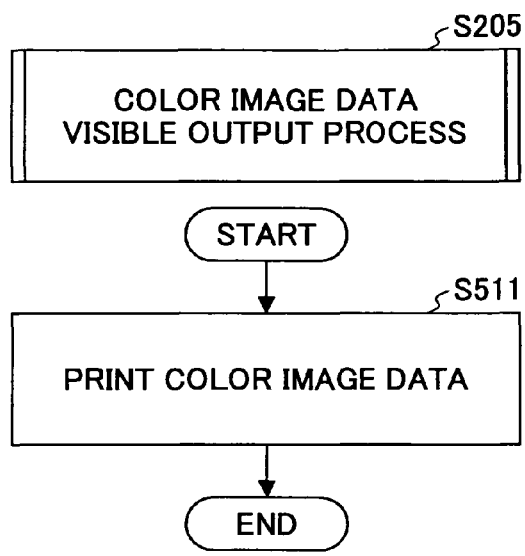

FIGS. 7A and 7B are flowcharts illustrating exemplary specific process steps for realizing the color image data visible output process step S205 of FIG. 3.

In the example of FIG. 7A, the color image data are displayed at a display such as the LCD 24 of FIG. 1, for example (step S501).

In this way, the user may view the original color image data corresponding to printed monochrome image data through simple operations.

In the example of FIG. 7B, the color image data are printed on a recording medium such as recording paper, for example (step S511). More specifically, the color image data may be color printed by the print engine 20 of FIG. 1, for example.

In this way, the user may view the original color image data corresponding to printed monochrome image data through simple operations.

In another example, the color image data may be displayed through the process step of FIG. 7A, and then printed thereafter if a color printing command is issued. In this way, execution of unnecessary color printing operations may be prevented. In this example, the user may end operations if he/she is satisfied by viewing the color display of the color image data; on the other hand, the user may execute color print command operations if he/she wishes to print the color image data in order to further scrutinize the image or to keep the image, for example.

According to an embodiment, by combining the image data input corresponding process of FIG. 2 and the color image data output process of FIG. 3, input color image data are basically automatically printed in monochrome format in order to reduce printing cost, and the original color image data is output in visible format though color display or color printing with simple operations when a request for such an output is issued by the user. In this embodiment, processes for adding color image data identification information to the corresponding monochrome image data to be printed and extracting the color image data identification information have to be performed. It is noted that in an alternative embodiment, such adding and extracting processes may be omitted.

Figure 10:
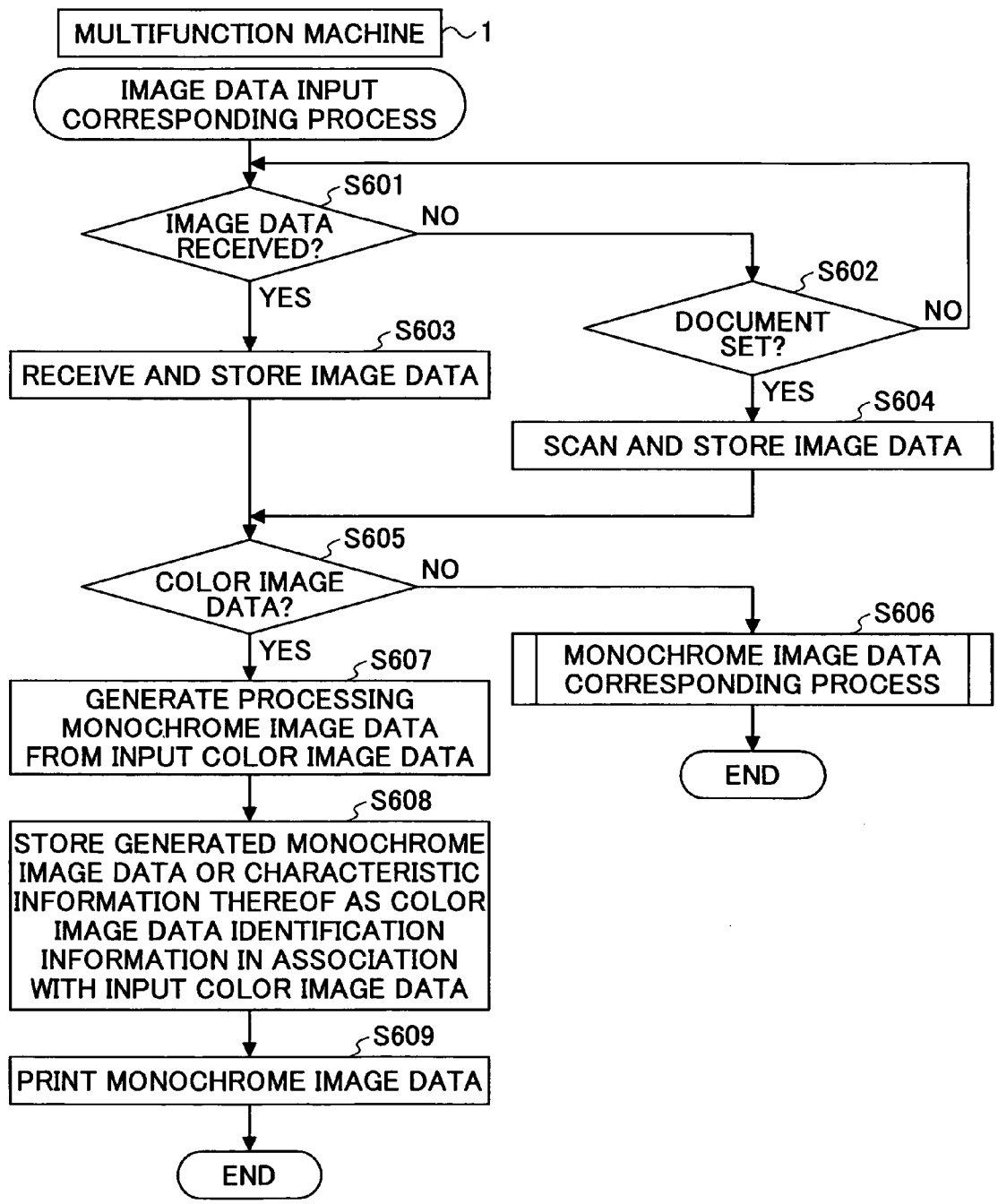
FIG. 10 is a flowchart illustrating process steps of an image data input corresponding process performed in the multifunction machine of FIG. 1 according to another embodiment of the present invention.
Figure 11:
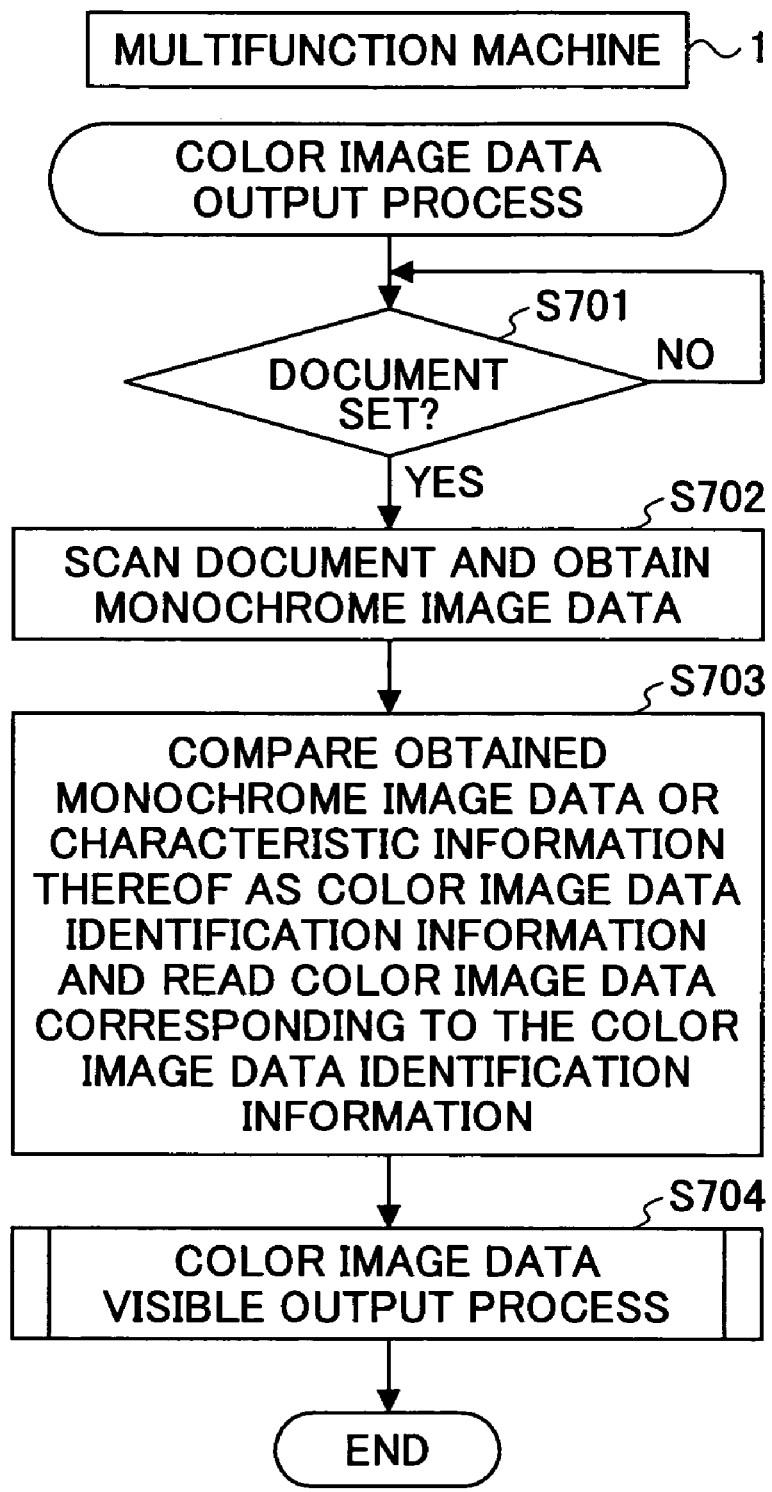
FIG. 11 is a flowchart illustrating process steps of a color image data output process performed in the multifunction machine of FIG. 1 according to another embodiment of the present invention.

For example, an image data input corresponding process as is illustrated in FIG. 10 may be performed instead of the image data input corresponding process of FIG. 2, and a color image data output process as is illustrated in FIG. 11 may be performed instead of the color image data output process of FIG. 3.

In the image data input corresponding process of FIG. 10, first, monitoring for monochrome or color image data input is performed. Specifically, the image data input monitoring is realized by determining whether image data are received or a document is set to the scanner 18 (i.e., loop realized by determination step S601, a negative determination 'NO' in step S601, determination step S602, and the negative determination 'NO' in step S602).

In the determination step S601, reception of image data is monitored. In this example, image data reception may be any type of reception including reception realized by the G3 Fax controller 27 through G3 facsimile communication via a PSTN (Public Switched Telephone Network) 200 (see FIG. 1), reception through real time network facsimile communication based on the ITU-T Recommendation T.38 via a LAN 300 (see FIG. 1), reception through email network facsimile transmission based on the ITU-T Recommendation T.37, and image data reception in response to a print request from another PC (personal computer) connected via the LAN 300 according to the SOAP protocol, for example. In other words, the reception being monitored in the determination step S601 may generally include any form of image data input from an apparatus or system other than the image processing apparatus 1. It is noted that color image data transmission/reception through G3 facsimile communication is defined in the ITU-T Recommendation T.30 Annex E.

When the G3 Fax controller 27 of the multifunction machine 1 receives color image data through G3 facsimile communication according to the ITU-T Recommendation T.30 Annex E, the CPU 10 issues a document number for unambiguously identifying the received color image data, and stores the document number in association with the corresponding received color image data in the hard disk 21.

In the present example, image data may be input in another manner; namely, a document may be scanned by the scanner 18 and the scanned image data may be input to the multifunction machine 1. Such input of image data through scanning by the scanner 18 is monitored in the determination step S602.

When it is determined in step S601 that image data are received ('Yes' in step S601), the image data are received and stored in the hard disk 21 (step S603), and the process moves on to determination step S605.

When it is determined in step S602 that a document has been set ('Yes' in step S602), the image of the document is scanned and the scanned image data are stored in the hard disk 21 (step S604) after which the process moves on to the determination step S605.

In the determination step S605, a determination is made as to whether the input image data correspond to color image data or monochrome image data. If it is determined that the input image data correspond to monochrome image data ('No' in step S605), a normal monochrome image data corresponding process is performed (step S606).

If it is determined in step S605 that the input image data correspond to color image data ('Yes' in step S605), a color image data corresponding processes are performed as is described below.

Specifically, the process moves on to step S607 in which processing monochrome image data are generated from the input processing color image data. Then, in step S608, the generated monochrome image data or characteristic information representing characteristics of the generated monochrome image data may be stored as color image data identification information in the hard disk 21 in association with the relevant input color image data that are already stored in the hard disk 21.

Then, in step S609, the generated monochrome image data are printed on recording paper by the print engine 20 without adding any additional data thereto.

According to the present embodiment, input color image data are printed as a monochrome image so that color toner, color ink, or a color ink ribbon (according to the print method implemented by the print engine 20) may be saved, and operations cost may be reduced.

More specifically, in the present embodiment, input color image data is automatically printed as a monochrome image without any command operation input from the user. It is noted that in most cases, contents or features of the input color image data may be adequately grasped from its corresponding printed monochrome image. Thus, the present embodiment may be preferred taking into consideration the merits of printing input image data as a monochrome image as opposed to a color image. Specifically, cost increase due to color printing undesired images such as color advertisement and spam images may be avoided. Also, in the present embodiment, a color image is not output (printed) from reproducing (copying) a color document; that is, a monochrome image is output upon reproducing the color document while the color image data obtained in the copying operation are stored to be used in a subsequent reproducing operation. In this way, a document may normally be reproduced as a monochrome image so that cost increase may be avoided.

It is noted that in some cases, a user may desire to view a printed image of input color image data in its original color image format. The image processing apparatus according to an embodiment of the present invention is configured to adequately correspond to such desires of the user.

Accordingly, in one embodiment, the image processing apparatus 1 is configured to perform the color image data output process of FIG. 11 which corresponds to the image data input corresponding process of FIG. 10.

In the color image data output process of FIG. 11, setting of a document to the scanner 18 is monitored (loop realized by determination step S701 and the negative determination step 'NO' in step S701). When a document is set to the scanner 18 ('Yes' in step S701), the document is scanned and monochrome image data of the document are obtained (step S702). It is noted that in step S702, color scanning of the document may be performed to obtain color image data of the document and post processing may be performed on the color image data to obtain monochrome image data corresponding to the obtained color image data, or alternatively, monochrome image data may be directly obtained from the document through monochrome scanning, for example.

Then, in step S703, the monochrome image data obtained in step S702 or characteristic information thereof as color image data identification information is compared with color image data identification information stored in association with corresponding color image data in the hard disk 21 in step S608 of FIG. 10, and the color image data associated with the relevant color image data identification information are identified and read from the hard disk 21. Then, in step 704, the read color image data are output in visible format.

By performing the above-described processes according to the present embodiment, color image data that are printed as a monochrome image may be output as a color image as is necessary or desired based on the printed monochrome image. More specifically, in the present embodiment, instead of having to go through the trouble of memorizing a corresponding registration number for desired color image data and requesting for the output of the color image data by designating the registration number, the user may simply set the printed monochrome image that he/she desires to view in color image format to the scanner 18 in a manner similar to the procedure for operating the scanner 18 to scan a document to be copied or transmitted, for example. In this way, a color image processing apparatus with good economical efficiency and good operability may be realized. Also, the processes of adding color image data identification information to the monochrome image data to be printed and extracting the color image data identification information may be omitted so that additional information may not have to be added to the monochrome image data to be printed and the generated monochrome image data may be closer to the original input color image data.

It is noted that the image comparing method used in step S703 of FIG. 11 may involve dividing an image into plural regions, extracting one or more objects included in each region, and comparing their attributes. In one specific example, a method as is disclosed in Japanese Patent No. 3522146 (Publication No. 11-316846), which is incorporated herein by reference in its entirety, may be used.

It is noted that the process step of FIG. 7A or FIG. 7B may be performed as step S704 of FIG. 11.

Figure 12:
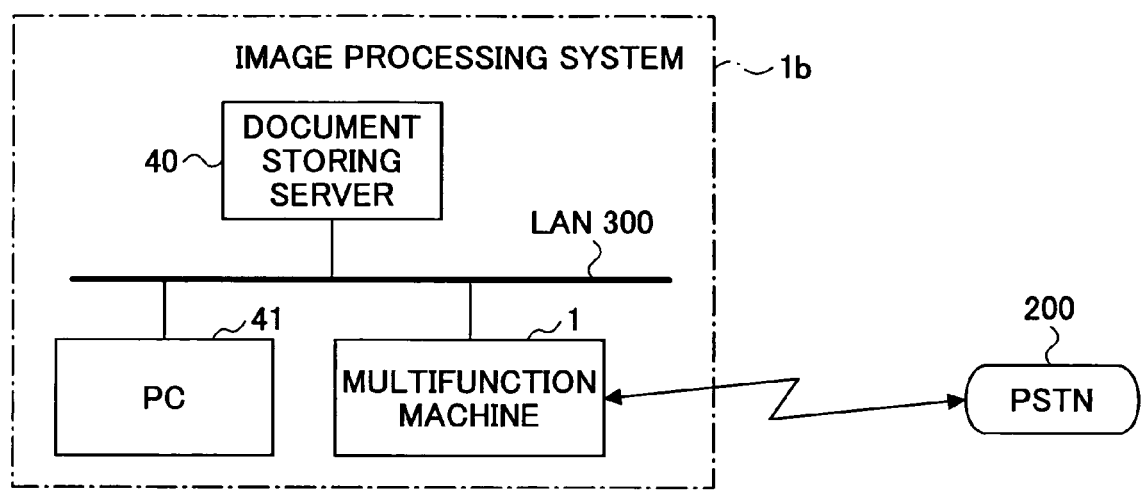
FIG. 12 is a block diagram showing a configuration of an image processing system according to an embodiment of the present invention.

According to an embodiment, the process steps of the image data input corresponding process of FIG. 2 and the color image data output process of FIG. 3 that are performed in the multifunction machine 1 shown in FIG. 1 may be performed in an image processing system 1*a* as is shown in FIG. 12.

The image processing system 1*a* of FIG. 12 includes the multifunction machine 1 of FIG. 1, a document storing server 40, and a PC 41 that are interconnected via a LAN 300. In this system 1*a*, the multifunction machine 1, the document storing server 40, and the PC 41 are configured to exchange data and information with each other via the LAN 300. It is noted that the PC 41 may include peripheral devices such as a keyboard, a mouse, an a display (not shown), for example.

Figure 13:
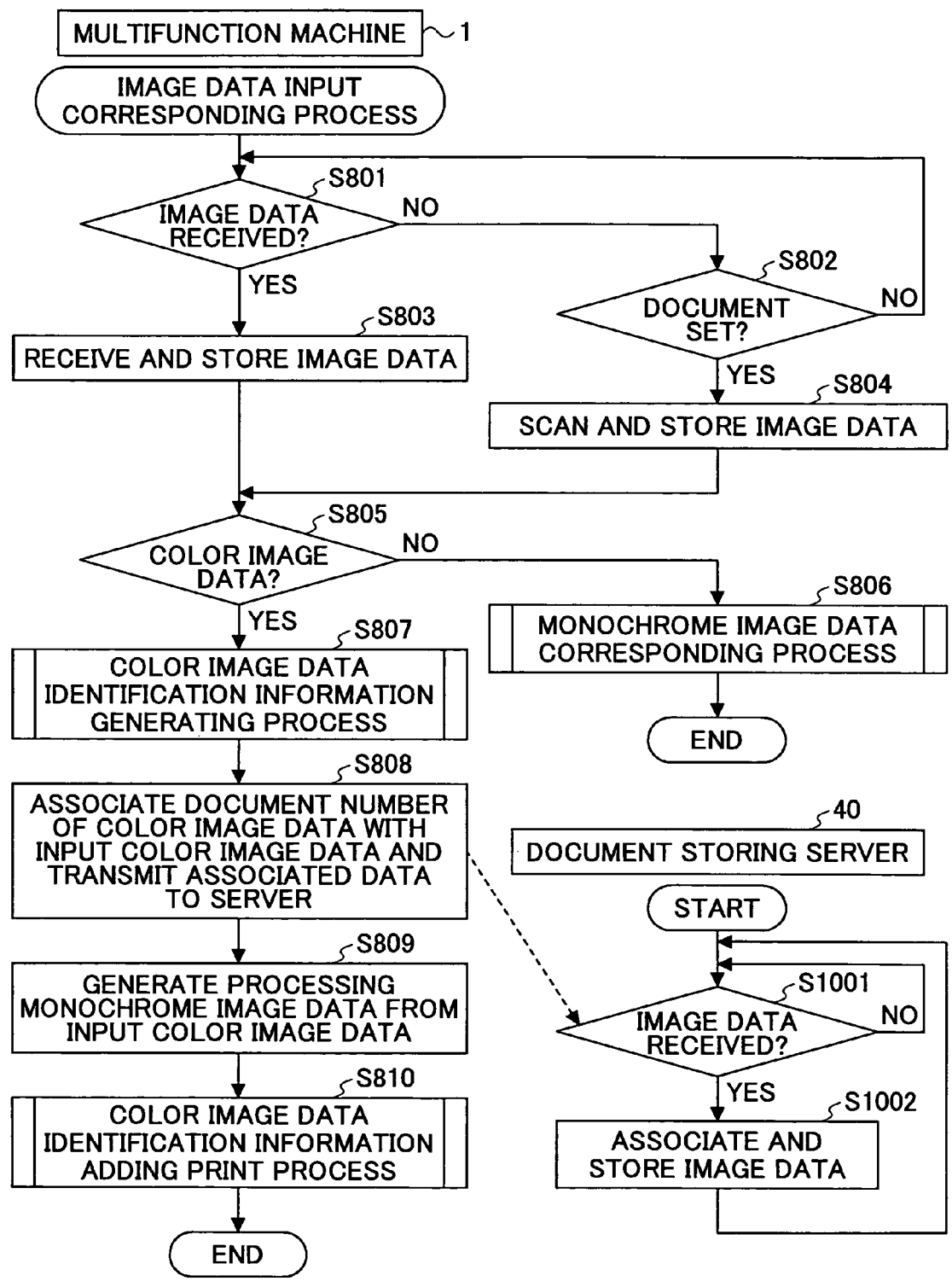
FIG. 13 is a flowchart illustrating process steps of an image data input corresponding process performed in the image processing system of FIG. 12 according to an embodiment of the present invention.
Figure 14:
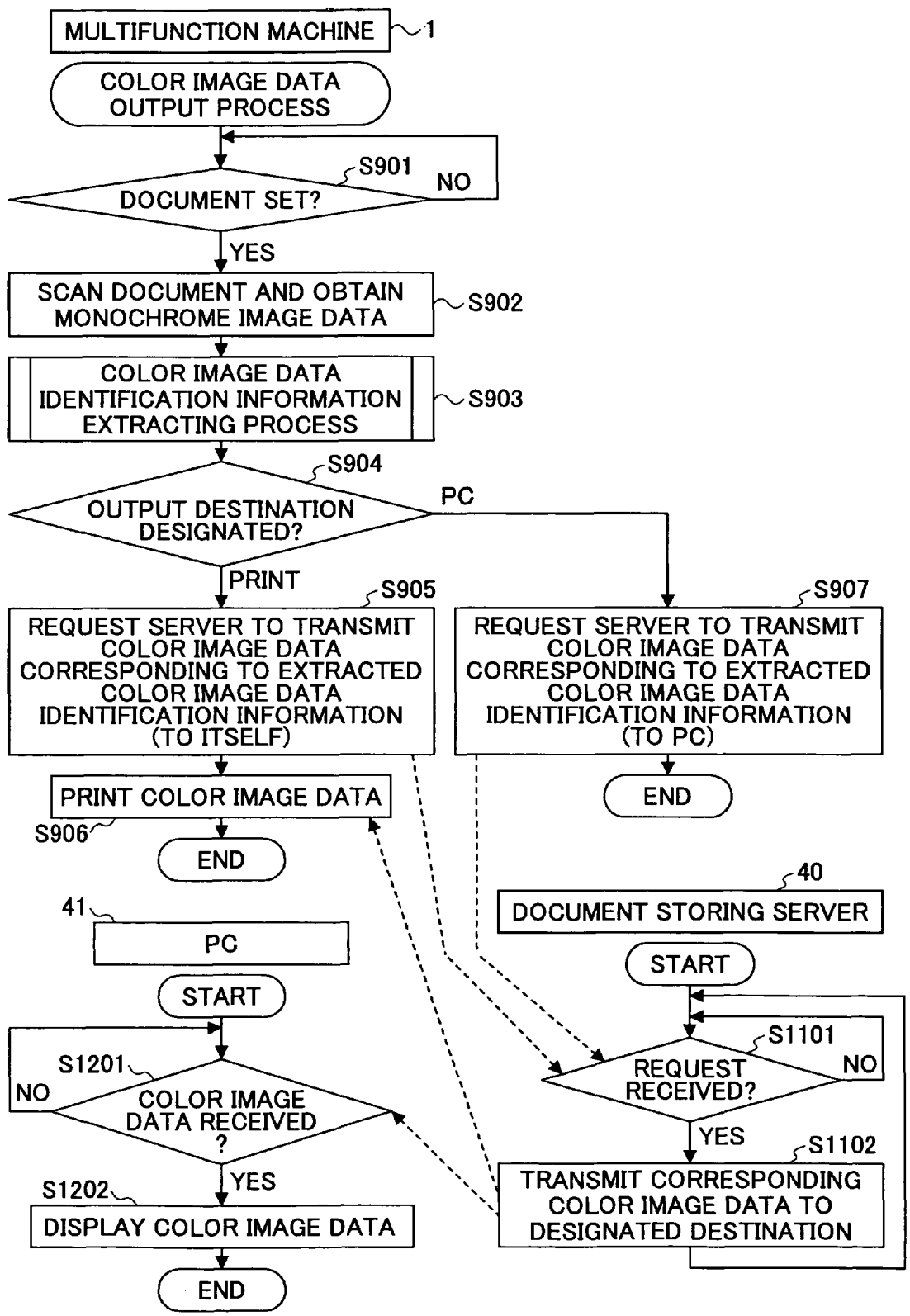
FIG. 14 is a flowchart illustrating process steps of a color image data output process performed in the image processing system of FIG. 12 according to an embodiment of the present invention.

In the image processing system 1*a* of FIG. 12, the multifunction machine 1 uses the document storing server 40 having large capacity data storage functions instead of the hard disk 21 corresponding to an internal storage device of the multifunction machine 1 for storing color image data, and the multifunction machine 1 uses the display of the PC 41 instead of the LCD 24 corresponding to a display device of the multifunction machine 1 for displaying color image data to perform process steps illustrated in FIGS. 13 and 14 corresponding to the process steps of the image data input corresponding process of FIG. 2 and the color image data output process of FIG. 3.

In the image data input corresponding process of FIG. 13, the multifunction machine 1 monitors input of monochrome or color image data. Specifically, multifunction machine 1 monitors whether image data are received or a document is set to the scanner 18 (i.e., loop realized by determination step S801, a negative determination 'NO' in step S801, determination step S802, and the negative determination 'NO' in step S802).

In the determination step S801, reception of image data is monitored. In this example, image data reception may be any type of reception including reception realized by the G3 Fax controller 27 through G3 facsimile communication via a PSTN (Public Switched Telephone Network) 200 (see FIG. 1), reception through real time network facsimile communication based on the ITU-T Recommendation T.38 via a LAN 300 (see FIG. 1), reception through email network facsimile transmission based on the ITU-T Recommendation T.37, and image data reception in response to a print request from another PC (personal computer) connected via the LAN 300 according to the SOAP protocol, for example. In other words, the reception being monitored in the determination step S801 may generally include any form of image data input from an apparatus or system other than the present multifunction machine 1. It is noted that color image data transmission/reception through G3 facsimile communication is defined in the ITU-T Recommendation T.30 Annex E.

When the G3 Fax controller 27 of the multifunction machine 1 receives color image data through G3 facsimile communication according to the ITU-T Recommendation T.30 Annex E, the CPU 10 issues a document number for unambiguously identifying the received color image data, and stores the document number in association with the corresponding received color image data in the hard disk 21.

In the present example, image data may be input in another manner; namely, a document may be scanned by the scanner 18 and the scanned image data may be input to the multifunction machine 1. Such input of image data through scanning by the scanner 18 is monitored in the determination step S802.

When it is determined in step S801 that image data are received ('Yes' in step S801), the image data are received and stored in the hard disk 21 (step S803), and the process moves on to determination step S805.

When it is determined in step S802 that a document has been set ('Yes' in step S802), the image of the document is scanned and the scanned image data are stored in the hard disk 21 (step S804) after which the process moves on to the determination step S805.

In the determination step S805, a determination is made as to whether the input image data correspond to color image data or monochrome image data. If it is determined that the input image data correspond to monochrome image data ('No' in step S805), a normal monochrome image data corresponding process is performed (step S806).

If it is determined in step S805 that the input image data correspond to color image data ('Yes' in step S805), color image data corresponding processes are performed as is described below.

Specifically, the process moves on to step S207 in which a color image data identification information generating process is performed. It is noted that the document number assigned to the input color image data is included in the color image data identification information. Then, in step S808, the document number assigned to the input color image data is associated with the input color image data stored in the hard disk 21 beforehand, and the associated data are transmitted to the document storing server 40. It is noted that the color image data that have been transmitted to the document storing server 40 may be deleted from the hard disk 21 once the currently performed operations process is ended. In this way, color image data may be prevented from taking up the storage capacity of the hard disk 21. It is noted that SOAP (Simple Object Access Protocol) may be used as the protocol for transmitting the document number associated with the corresponding color image data to the document storing server 40.

Then, in step S809, processing monochrome image data are generated from the input color image data. In one example, color image data received through G3 facsimile communication are encoded according to the JPEG standard (ITU-T Recommendation T.81, ISO/IEC 10918-1), and the received color image data are decoded according to the JPEG standard after which brightness component data of the respective pixels of the decoded image data are extracted to generate the monochrome image data.

Then, the color image data identification information generated in step S807 is added to (combined with) the generated monochrome image data according to a predetermined format (details of which are described below), and the monochrome image data with the color image data identification information are printed on a recording medium such as recording paper (step S810) after which the process is ended.

The document storing server 40 monitors reception of data transmitted from the multifunction machine 1 in step S808 (i.e., loop realized by determination step S1001 and a negative determination 'NO' in step S1001). When data transmitted in step S808 are received ('YES' in step S1001), the received document number and the corresponding color image data are associated with each other and stored in a large capacity storage device of the document storing server 40 (step S1002), and the process goes back to determination step S1001.

According to the present embodiment, input color image data are printed as a monochrome image so that color toner, color ink, or a color ink ribbon (according to the print method implemented by the print engine 20) may be saved, and operations cost may be reduced.

More specifically, in the present embodiment, input color image data is automatically printed as a monochrome image without any command operation input from the user. It is noted that in most cases, contents or features of the input color image data may be adequately grasped from its corresponding printed monochrome image. Thus, the present embodiment may be preferred taking into consideration the merits of printing input image data as a monochrome image as opposed to a color image. Specifically, cost increase due to color printing undesired images such as color advertisement and spam images may be avoided. Also, in the present embodiment, a color image is not output (printed) from reproducing (copying) a color document; that is, a monochrome image is output upon reproducing the color document while the color image data obtained in the copying operation are stored to be used in a subsequent reproducing operation. In this way, a document may normally be reproduced as a monochrome image so that cost increase may be avoided.

It is noted that in some cases, a user may desire to view a printed image of input color image data in its original color image format. The image processing system according to an embodiment of the present invention is configured to adequately correspond to such desires of the user.

Accordingly, the image processing system 1a of the present embodiment is configured to perform the image data input corresponding process as is illustrated in FIG. 13, and the color image data output process as is illustrated in FIG. 14.

In the color image data output process of FIG. 14, the multifunction machine 1 monitors the scanner 18 to check if a document is set thereto (loop realized by determination step S901 and the negative determination step 'NO' in step S901). When a document is set to the scanner 18 ('Yes' in step S901), the document is scanned and monochrome image data of the document are obtained (step S902). It is noted that in step S902, color scanning of the document may be performed to obtain color image data of the document and post processing may be performed on the color image data to obtain monochrome image data corresponding to the obtained color image data, or alternatively, monochrome image data may be directly obtained from the document through monochrome scanning, for example.

Then, a color image data identification information extracting process is performed on the obtained monochrome image data (step S903), and the operations input designating an output destination is determined (step S904).

In one example, if it is determined in step S904 that 'PRINT' is designated as the output destination; that is, if the operations input designates printing of the processing color image data on recording paper using the print engine 20, which is arranged at the multifunction machine 1, the multifunction machine 1 sends a transmission request to the document storing server 40 requesting for the transmission of the color image data corresponding to the color image data identification information extracted in step S903, the transmission request including the document number and the transmission destination of the requested color image data (step S905). In the present case, the multifunction machine 1 is designated as the transmission destination. It is noted that the transmission destination information may be any form of information that may enable the document storing server 40 to identify the multifunction machine 1 over the LAN 300. For example, the IP address of the multifunction machine 1 may be used. Also, a host name may be used, and in such a case, the document storing server 40 is configured to access a predetermined DNS (Domain Name System) server (not shown) to perform address resolution and thereby obtain the IP address of the corresponding transmission destination.

In the present example, the document storing server 40 monitors reception of a transmission request that is sent thereto from the multifunction machine 1 in step S905 (i.e., loop realized by determination step S1101 and a negative determination 'NO' in step S1101). If a transmission request is received ('YES' in step S1101), the color image data stored in association with the document number that is transmitted with the transmission request are read out and transmitted to the designated destination; namely, the multifunction machine 1 in the present case (step S1102), and the process goes back to step S1101.

In response to receiving the requested color image data that are transmitted from the document storing server 40 in step S1102, the multifunction machine 1 prints the received color image data using the print engine 20 to output the color image data in visible format (step S906).

In another example, if it is determined in step S904 that 'PC' is designated as the output destination at the multifunction machine 1, a transmission request is sent to the document storing server 40 requesting for color image data corresponding to the color image data identification information extracted in step S903 (step S907). In this case, 'PC' is designated as the transmission destination in the transmission request. It is noted that the transmission destination may be designated by registering the IP address of the PC 41 beforehand as the destination IP address for 'PC', and the transmission request may designate the pre-registered destination IP address for 'PC' as the transmission destination, or an IP address may be input each time an output destination is designated, for example. Also, it is noted that the designation of the transmission destination for 'PC' is not limited to use of an IP address, and a host name may alternatively be used, for example. In such a case, the document storing server 40 is configured to access a predetermined DNS (Domain Name System) server (not shown) to perform address resolution and thereby obtain the IP address of the corresponding transmission destination.

In the present example, the document storing server 40 monitors reception of a transmission request that is sent thereto from the multifunction machine 1 in step S907 or step S905 (i.e., loop realized by determination step S1101 and a negative determination 'NO' in step S1101). If a transmission request is received ('YES' in step S1101), the color image data stored in association with the document number that is transmitted with the transmission request are read out and transmitted to the designated destination; namely, the PC 41 in the present case (step S1102), and the process goes back to step S1101.

The PC 41 monitors reception of color image data transmitted from the document storing server 40 in step S1102 (i.e., loop realized by determination step S1201 and the negative determination 'NO' in step S1201), and upon receiving color image data ('YES' in step S1201), the PC 41 displays the received color image data on its display monitor (step S1202).

According to the present embodiment, the multifunction machine 1 may make effective use of the resources of the document storing server 40 and the PC 41 that are connected to the multifunction machine 1 via the LAN 300. In this way, a convenient image processing system may be realized that is not constrained by the limitations in the storage capacity and the display capabilities of the multifunction machine 1.

As can be appreciated from the above descriptions, in the present embodiment, the image processing system 1a of FIG. 12 is arranged to perform the process steps of FIGS. 13 and 14 that correspond to the process steps of FIGS. 2 and 3 performed by the multifunction machine 1 of FIG. 1. It is noted that a similar arrangement is possible with regard to the process steps of FIGS. 10 and 11 performed by the multifunction machine 1 of FIG. 1 according to another embodiment.

Specifically, the image processing system 1a of FIG. 12, configured to distribute the color image data storing function of the multifunction machine 1 to the document storing server 40 and the color image data displaying function of the multifunction machine to the PC 41, may be arranged to perform process steps corresponding to the process steps of FIGS. 10 and 11 performed by the multifunction machine 1 of FIG. 1.

Figure 15:
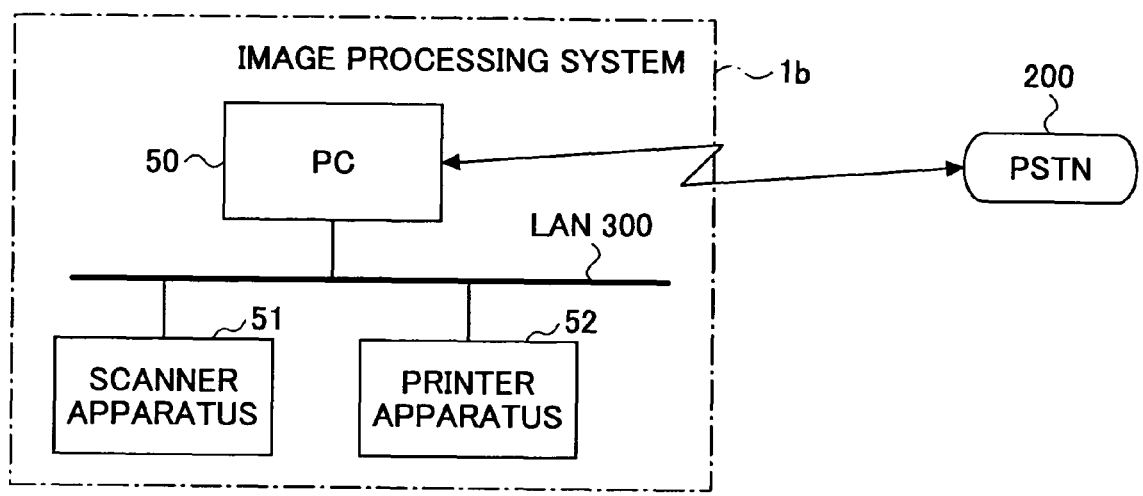
FIG. 15 is a block diagram showing a configuration of an image processing system according to another embodiment of the present invention.

In another embodiment, the process steps of FIGS. 2 and 3 or the process steps of FIGS. 10 and 11 that are performed by the multifunction machine 1 may be adapted for execution by an image processing system 1b as is shown in FIG. 15.

The image processing system 1b of FIG. 15 includes a scanner apparatus 51, a printer apparatus 52, and a PC 50 that are interconnected via a LAN 300. It is noted that the PC 50 includes peripheral devices such as a keyboard, a mouse, and a display, for example (not shown). The PC 50 may be a computer conforming to the PC-AT (Personal Computer for Advanced Technologies) architecture disclosed by International Business Machines Corporation in 1984. In the PC 50, a fax board (not shown) for realizing G3 Fax communication via a telephone line is arranged to be connected to a PCI bus, and this fax board is connected to the PSTN 200.

The image processing system 1b uses the PC 50 to realize functions of the multifunction machine 1 such as a color image data receiving function (via the PSTN 200), a color/monochrome image data read function (scanner apparatus 51), a color/monochrome image data print function (printer apparatus 52), a color image data display function (display monitor of PC 50), and an operations input function. In other words, the inherent functions of a personal computer provided in the PC 50 such as a storage function (e.g., realized by a hard disk) and an information processing function are combined with functions realized by software to realize functions substantially identical to those of the multifunction machine 1 in the PC 50. In the present system 1b, acquisition of image data by the PC 50 from the scanner apparatus 51 and transfer of image data associated with a print request to the printer apparatus 52 may be realized via the LAN 300 through application control according to predetermined protocols. Accordingly, process steps corresponding to those of FIGS. 2 and 3 or FIGS. 10 and 11 performed at the multifunction machine 1 of FIG. 1 may be realized at the image processing system 1b of FIG. 15 through application program control of the PC 50.

As can be appreciated from the above descriptions, according to preferred embodiments of the present invention, color image data input to an image processing apparatus such as the multifunction machine 1 or an image processing system such as the image processing system 1a or 1b are output (printed) as monochrome image data so that operations cost may be reduced, and at the same time, the original color image data may be output upon request by a user wishing to view such color image data through simple operations. In this way, an economically viable and convenient image processing apparatus and image processing system may be realized.

Specifically, color image data that are input to an image processing system according to an embodiment of the present invention are basically printed as monochrome image data on a recording medium such as recording paper rather than printing the input color image data in color format. In this way, consumption of color recording material such as color ink for inkjet recording, color toner for electrophotographic printing, and color ink ribbons for thermal transfer printing may be reduced. It is noted that in most cases contents of the input color image data may be adequately grasped even when such color image data are printed as monochrome image data. After the input color image data are printed as monochrome image data, if a user wishes to view the original input color image data, the system of the present embodiment may be arranged to read the printed monochrome image data as a reference to output the original color image data in visible format. In this way, the original color image data may be viewed through simple procedures, and the user may be relieved of the trouble of having to go through complicated procedures to designate the color image data to be output in color format. Thus, according to an embodiment of the present invention, an economical and convenient image processing system may be provided that can reduce printing cost by printing input color image data as monochrome image data, and is also suitably adapted for enabling the user to view the original color image data.

According to one embodiment, color image data identification information is added to the monochrome image data to be printed in order to enable identification of the corresponding color image data based on the printed monochrome image data. In another embodiment, color image data identification information is not added to the monochrome image data to be printed so that visual appearance of the printed monochrome image may not be degraded and inconveniences due to errors in the extraction of the added color image data identification information may be avoided, for exmaple.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-031057 filed on Feb. 7, 2005, the entire contents of which are hereby incorporated by reference.

What is claimed is:

1. An image processing system, comprising:
    a color image input unit configured to input color image data;

a color image identification information generating unit configured to generate color image data identification information that identifies the color image data input by the color image input unit;

an image data storing unit configured to store the color image data identification information in association with the color image data;

a monochrome image generating unit configured to generate monochrome image data based on the color image data;

a monochrome image output unit configured to generate composite image data by adding the color image data identification information to the monochrome image data, and to print the composite image data on a first recording medium;

an image reading unit configured to read the composite image data from the first recording medium and input the composite image data;

an identification information extracting unit configured to extract the color image data identification information from the composite image data read by the image reading unit; and a color image output unit configured to read from the image data storing unit the color image data identified by the color image data identification information extracted by the identification information extracting unit and output the color image data in a visible format, wherein the color image data identification information is used to acquire the color image data stored in the image data storing unit.

2. The image processing system as claimed in claim 1, wherein the color image input unit receives the color image data from a communication counterpart.

3. The image processing system as claimed in claim 1, wherein the color image input unit reads the color image data from a physical document.

4. The image processing system as claimed in claim 1, wherein the color image output unit prints the color image data on a second recording medium.

5. The image processing system as claimed in claim 1, wherein the color image output unit displays the color image data on a display unit.

6. The image processing system as claimed in claim 1, wherein the monochrome image output unit generates barcode image data including the color image data identification information, adds the generated barcode image data to the monochrome image data to generate the composite image data, and prints the composite image data on the first recording medium, and the identification information extracting unit extracts the color image data identification information from the barcode image data included in the composite image data input by the image reading unit.

7. The image processing system as claimed in claim 1, wherein the monochrome image output unit generates two-dimensional code image data including the color image data identification information, adds the generated two-dimensional code image data to the monochrome image data to generate the composite image data, and prints the composite image data on the first recording medium, and the identification information extracting unit extracts the color image data identification information from the two-dimensional code image data included in the composite image data input by the image reading unit.

8. The image processing system as claimed in claim 1, wherein the monochrome image output unit generates digital watermark data including the color image data identification information, adds the generated digital watermark data to the monochrome image data to generate the composite image data, and prints the composite image data on the first recording medium, and the identification information extracting unit extracts the color image data identification information from the digital watermark data included in the composite image data input by the image reading unit.

9. An image processing apparatus, comprising:

a color image input unit configured to input color image data;

a monochrome image generating unit configured to generate monochrome image data based on the color image data;

a color image identification information generating unit configured to generate at least one of the monochrome image data and characteristic information extracted from the monochrome image data as color image data identification information that identifies the color image data, and to store the color image data identification information in association with the color image data in an image data storing unit;

a monochrome image output unit configured to print the monochrome image data on a first recording medium;

an image reading unit configured to read the monochrome image data from the first recording medium and input the monochrome image data;

an identification information extracting unit configured to extract the color image data identification information corresponding to at least one of the monochrome image data read by the image reading unit and the characteristic information extracted from the monochrome image data read by the image reading unit; and a color image output unit configured to compare and match the color image data identification information extracted by the identification information extracting unit with the color image data identification information stored in the image data storing unit, identify the color image data associated with the matched color image data identification information, read from the image data storing unit the identified color image data, and output the read color image data in a visible format, wherein the color image data identification information is used to acquire the color image data stored in the image data storing unit.

10. An image processing apparatus, comprising:

a color image input unit configured to input color image data;

a color image identification information generating unit configured to generate color image data identification information that identifies the color image data input by the color image input unit;

an image data storing unit configured to store the color image data identification information in association with the color image data;

an monochrome image generating unit configured to generate monochrome image data, having an amount of data smaller than that of the color image data, based on the color image data;

a monochrome image output unit configured to add the color image data identification information to the monochrome image data to generate composite image data and to output the composite image date;

an image reading unit configured to read the output composite image data and input the composite image data;

an color image identification information extracting unit configured to extract the color image data identification information from the composite image data read by the image reading unit; and a color image output unit configured to read from the image data storing unit the color image data identified by the color image data identification information extracted by the color image identification information extracting unit and output the color image data in a visible format, wherein the identification information is used to acquire the first image data.

11. The image processing apparatus of claim 10, wherein the monochrome image output unit is configured to print the composite image data on a recording medium.

* * * * *